(12) United States Patent
Justin et al.

(10) Patent No.: US 11,645,663 B2
(45) Date of Patent: May 9, 2023

(54) CALCULATING AND DISPLAYING IMPLICIT POPULARITY OF PRODUCTS

(71) Applicant: INTERNATIONAL BUSINESS MACHINES CORPORATION, Armonk, NY (US)

(72) Inventors: Josephine E. Justin, Bangalore (IN); Jayakarthik Jayabalan, Chennai (IN); Kuntal Dey, New Delhi (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

(21) Appl. No.: 15/964,837

(22) Filed: Apr. 27, 2018

(65) Prior Publication Data

US 2019/0333075 A1    Oct. 31, 2019

(51) Int. Cl.
*G06Q 30/02* (2012.01)
*G06Q 30/06* (2012.01)
*H04W 4/35* (2018.01)
*G06V 40/20* (2022.01)
*G06Q 30/0201* (2023.01)
*G06Q 30/0601* (2023.01)

(52) U.S. Cl.
CPC ..... *G06Q 30/0201* (2013.01); *G06Q 30/0625* (2013.01); *G06Q 30/0631* (2013.01); *G06V 40/20* (2022.01); *H04W 4/35* (2018.02)

(58) Field of Classification Search
USPC ...................................................... 705/7.29
See application file for complete search history.

(56) References Cited

U.S. PATENT DOCUMENTS 7,814,029 B1 *  10/2010  Siegel ............... G06Q 30/0282
                                                                  705/347
10,121,164 B2 *  11/2018  Aoki ................. G06Q 30/0251
(Continued)

OTHER PUBLICATIONS

Leykin et al., Detecting Shopper Groups in Video Sequences, 2014, IEEE (Year: 2014).*

(Continued)

*Primary Examiner* — Timothy Padot
*Assistant Examiner* — Allison M Robinson
(74) *Attorney, Agent, or Firm* — Rakesh Roy; Andrew D. Wright; Calderon, Safran & Cole, P.C.

(57) ABSTRACT

Systems and methods for calculating and displaying implicit popularity of products are disclosed. In embodiments, a computer-implemented method, comprises: determining, by a computing device, a set of consumer actions related to a product based on recorded consumer interaction data, wherein the set of consumer actions comprise a plurality of different physical actions of multiple consumers over a span of time; aggregating, by the computing device, the set of consumer actions by type of physical action over time to produce aggregated action event data; calculating, by the computing device, an implicit popularity number for the product based on the aggregated action event data; and sending, by the computing device, a display category to a product display device associated with the product based on the implicit popularity number, wherein the display category represents a measure of consumer popularity of the product.

17 Claims, 5 Drawing Sheets

(56) References Cited

U.S. PATENT DOCUMENTS

| | | | |
|---|---|---|---|
| 10,318,986 B1* | 6/2019 | Southworth | G06Q 30/0613 |
| 10,354,262 B1* | 7/2019 | Hershey | H04L 67/535 |
| 10,832,281 B1* | 11/2020 | Langdon | G06Q 30/0251 |
| 2012/0095805 A1 | 4/2012 | Ghosh et al. | |
| 2012/0226586 A1* | 9/2012 | Paul | G06Q 30/06 705/26.61 |
| 2014/0164190 A1* | 6/2014 | Schiffman | G06Q 30/0641 705/27.1 |
| 2014/0365334 A1* | 12/2014 | Hurewitz | G06Q 30/0613 705/26.41 |
| 2015/0081469 A1* | 3/2015 | Acharyya | G06Q 30/0631 705/26.7 |
| 2015/0348059 A1* | 12/2015 | Agara | G06Q 30/0601 705/7.29 |
| 2015/0356568 A1* | 12/2015 | Milstein | H04M 3/51 705/304 |
| 2015/0371321 A1* | 12/2015 | Chapuis | G09F 19/02 705/27.1 |
| 2016/0253735 A1 | 9/2016 | Scudillo et al. | |

OTHER PUBLICATIONS

Liu et al., Customer Behavior Classification Using Surveillance Camera for Marketing, 2016, Springer Science+ Business Media (Year: 2016).*

* cited by examiner

CALCULATING AND DISPLAYING IMPLICIT POPULARITY OF PRODUCTS

BACKGROUND

The present invention relates generally to consumer data utilization and, more particularly, to calculating and displaying implicit popularity of products in a physical store.

Consumer data related to aggregate consumer buying habits and product preferences is often utilized by consumers/customers in on-line environments to make informed decision regarding which products to purchase. Such consumer data may include ratings, reviews and comments regarding items available for purchase. Online retailers may aggregate consumer data in different ways, including by make (e.g., brand) or model (e.g., specific product).

In retail environments, systems exist which enable a user to obtain information regarding products of interest via their mobile devices (e.g. smartphones). Systems also exist that gather product interaction data in a retail environment on a consumer by consumer basis, for use in providing each consumer with marketing materials, and for providing additional information to sales clerks in order to better assist the individual consumers. Moreover, specialty stores may mount static displays showing predetermined ratings of products such as wines.

SUMMARY

In an aspect of the invention, a computer-implemented method includes: determining, by a computing device, a set of consumer actions related to a product based on recorded consumer interaction data, wherein the set of consumer actions comprise a plurality of different physical actions of multiple consumers over a span of time; aggregating, by the computing device, the set of consumer actions by type of physical action over time to produce aggregated action event data; calculating, by the computing device, an implicit popularity number for the product based on the aggregated action event data; and sending, by the computing device, a display category to a product display device associated with the product based on the implicit popularity number, wherein the display category represents a measure of consumer popularity of the product.

In another aspect of the invention, there is a computer program product for calculating and displaying implicit popularity of products. The computer program product comprises a computer readable storage medium having program instructions embodied therewith. The program instructions are executable by a computing device to cause the computing device to: receive consumer interaction data from one or more remote consumer monitoring devices in a retail environment; determine consumer actions related to a product based on the consumer interaction data; aggregate the consumer actions by type of action over time to produce aggregated action event data; calculate an implicit popularity number for the product based on the aggregated action event data; and send a display category to a product display device associated with the product based on the implicit popularity number, wherein the display category represents a measure of consumer popularity of the product.

In another aspect of the invention, there is a system for calculating and displaying implicit popularity of products. The system includes a CPU, a computer readable memory and a computer readable storage medium associated with a computing device; a plurality of consumer monitoring devices adapted to record consumer interaction data; a product display device adapted to display a display category thereon; program instructions to determine consumer actions related to a product based on the consumer interaction data, wherein the consumer actions comprise actions of multiple consumers over time; program instructions to aggregate the consumer actions by type of action over time to produce aggregated action event data; program instructions to calculate an implicit popularity number for the product based on the aggregated action event data; and program instructions to send the display category to the product display device based on the implicit popularity number.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
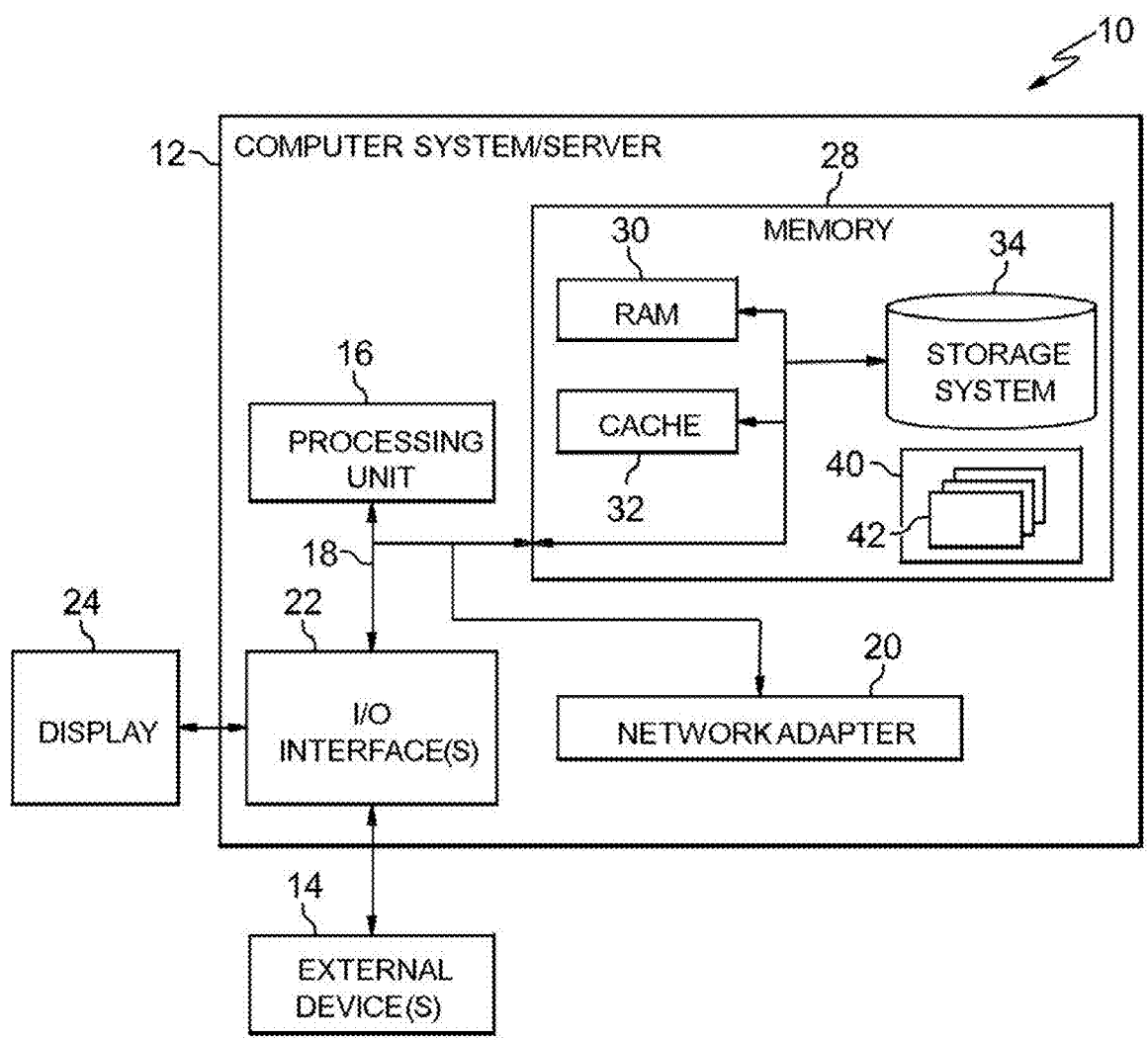
FIG. 1 depicts a computing infrastructure according to an embodiment of the present invention.

The present invention relates generally to consumer data utilization and, more particularly, to calculating and displaying implicit popularity of products in a physical store. In embodiments, a system and method is provided to enable the display of the implicit popularity of a given product in a retail environment based on consumers' interactions with the product in the retail environment. Such interactions may include intently gazing at the product, picking up the product but not keeping it in a shopping cart or basket, stretching hands out to pick up the product but not picking it up, picking it up and putting it in a shopping cart, etc. The implicit popularity of a product may be displayed to a consumer in the form of an emoji (e.g., emoticon) or other indicator of implicit popularity.

In aspects, a system of the invention tracks consumer interactions at a product type level over a time window by tracking and aggregating the interactions of consumers with individual products of that product type. For example, the system may track how many times products of a given product type are intently looked at but not picked up, how many times consumers' hands stretched to pick up a product but did not pick it up, etc. Consumer interaction data may be grouped for all product types, and each of the consumer actions aggregated (e.g., total number of consumer interest fixation events per product are aggregated, total durations of fixation events are aggregated, the number of times hands were stretched towards a product is aggregated, etc.). In aspects a given set of key performance indicators (KPIs) (e.g., a subset of aggregated consumer actions) are determined for the product. In embodiments, emotions associated with a product are determined by taking a weighted combination of KPIs. For example, the emotion "happy" may be associated with a product type that is often picked up and ends up in a shopping cart, while the emotion "sad" may be associated with a product type that is often looked upon intently by consumers, but rarely picked up or put into a shopping cart. One or more specialized display devices attached to products for sale may display a display category indicative of the determined emotions (e.g., a smiley face emoji indicative of the emotion "happy" for a popular product).

Embodiments of the present invention constitute technical improvements in the field of consumer data utilization and retail management. In aspects, a system of the invention increases the functionality of a retail management system by enabling implicit popularity calculations based on on-site (retail location) aggregated consumer interaction data. Moreover, aspects of the invention increase the functionality of retail managements systems by enabling automatic real-time display of a measure of consumer popularity of a product (e.g., via an emoji), based on the continuous collection of on-site consumer interaction data. While product ratings and reviews (e.g. likes/dislikes of a product) are readily gathered and available to consumers in an online retail environment, there is no equivalent system for brick and mortar stores to gather consumer interaction data for products or types of products. Advantageously, systems of the invention enable the determination of the implicit popularity of products and product types based on physical actions of consumers in a brick and mortar retail environment, the dynamic display of the implicit popularity of products in the retail environment based on real-time data, and updating of the display based on continuous analysis of the real-time data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
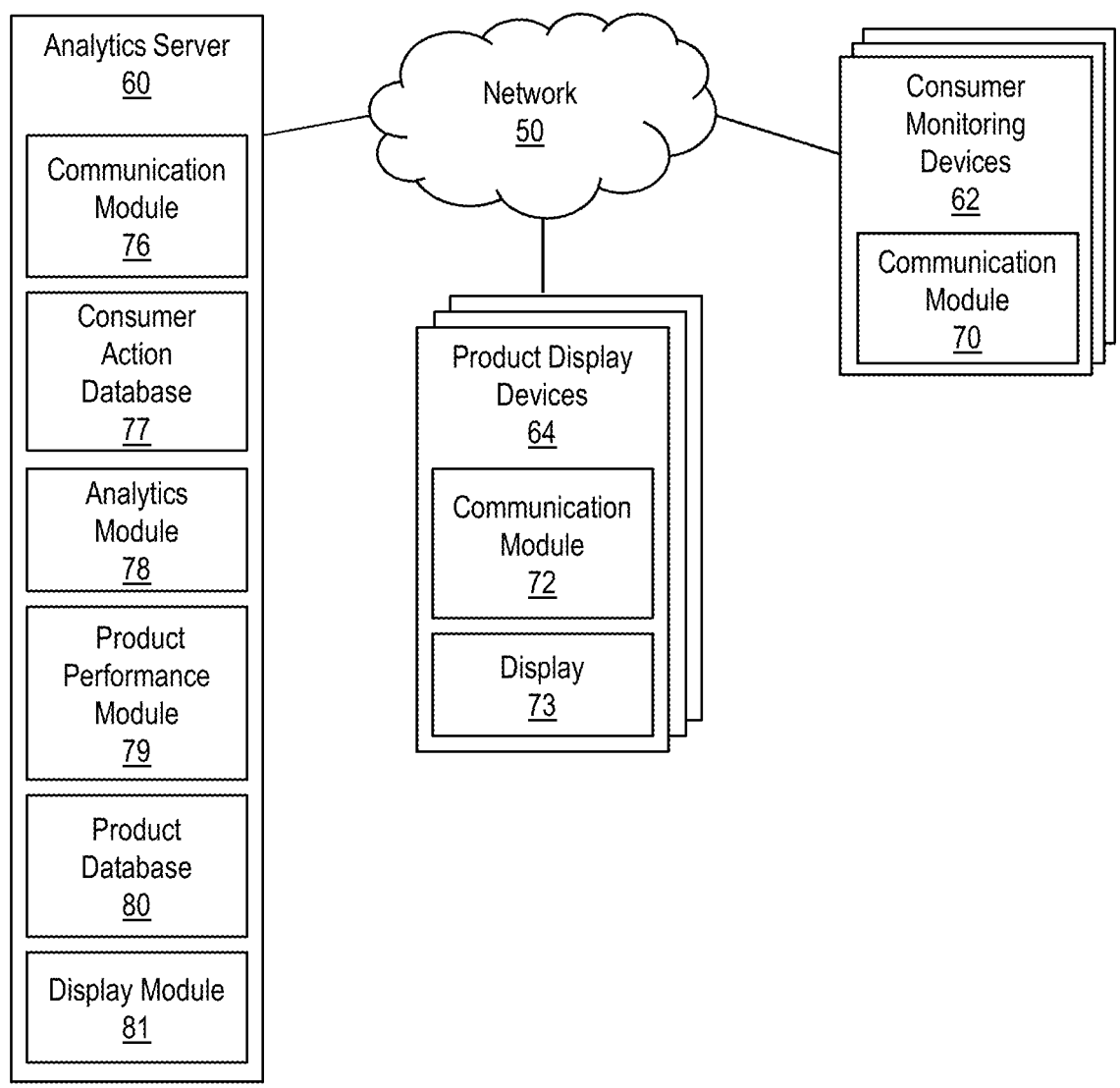
FIG. 2 shows an exemplary environment in accordance with aspects of the invention.

FIG. 2 shows an exemplary environment in accordance with aspects of the invention. The environment includes a network 50 connecting an analytics server 60 with one or more consumer monitoring devices 62 and one or more product display devices 64. The analytics server 60 may comprise a computer system 12 of FIG. 1, and may be connected to the network 50 via the network adapter 20 of FIG. 1. The analytics server 60 may be configured as a special purpose computing device that is part of a retail management infrastructure. For example, the analytics server may be configured to receive consumer interaction data from the consumer monitoring devices 62 and display an output to consumers via the product display devices 64. The term consumer interaction data as used herein refers to data representative of physical actions performed by one or more consumers, and may include actions of the eyes, hands, and body of consumers, for example.

The network 50 may be any suitable communication network or combination of networks, such as a local area network (LAN), a general wide area network (WAN), and/or a public network (e.g., the Internet). The consumer monitoring devices 62 may be in the form of one or more cameras, sensors, or combinations thereof. In aspects, the consumer monitoring devices 62 each include a communication module 70 for communicating with the analytics server 60 via the network 50 either directly or through wireless communication. Alternatively, a single communication module 70 may be utilized by multiple consumer monitoring devices 62.

In embodiments, the product display devices 64 each comprise a communication module 72 configured to communicate with the analytics server 60 through the network 50, either directly or through wireless communication. Alternatively, a single communication module 72 may connect multiple product display devices 64 to the analytics server 60 via the network 50. In aspects, a display 73 of each of the product display devices 64 is configured to display information received from the analytics server 60 through the network 50. The display 73 may be in the form of a digital display, such as a light emitting diode (LED) display, a liquid crystal display (LCD), a plasma display panel (PDP), or the like. The product display device 64 may include a connector (not shown) for removably connecting the product display device to a product, such as an adhesive strip, a magnet, a hook and loop fastener, or a mechanical connector (e.g., attachment arms, bolts, screws, straps, etc.).

Still referring to FIG. 2, the analytics server 60 may include one or more modules configured to perform one or more functions as described herein, with each module including one or more program modules (e.g., program module 42 of FIG. 1) executed by the analytics server 60. In embodiments, a communication module 76 of the analytics server 60 is configured to communicate with the communication modules 70 and 72 of the respective consumer monitoring devices 62 and product display devices 64. In aspects, the communication module 76 receives consumer interaction data from the consumer monitoring devices 62 and stores the consumer interaction data in a consumer action database 77.

In embodiments, the analytics server 60 includes an analytics module 78 configured to analyze the consumer interaction data to determine consumer actions related to one or more products or product categories. In aspects, the analytics module 78 is configured to aggregate consumer action data by type of action to produce aggregate action event data for multiple consumers over time. The aggregate action event data may be saved in the consumer action database 77.

In embodiments, the analytics server 60 includes a product performance module 79 configured to calculate an implicit popularity number for one or more products based on aggregate action event data. In aspects, the analytics server 60 saves the implicit popularity numbers (popularity data) in a product database 80. In embodiments the analytics server 60 is further configured to determine a display category for one or more products based on the implicit popularity number(s) in the product database 80. Display categories may be in the form of one or more emoji, the implicit popularity number, symbolic ratings associated with the implicit popularity number, or combinations thereof.

In embodiments, the analytics server 60 includes a display module 81 configured to send one or more display categories to respective product display devices 64 to be displayed by the respective displays 73. In aspects, the display module 81 matches one or more display categories to their associated products, and sends the one or more display categories to the product display devices 64 of the associated products for display.

The quantity of devices and/or networks in the environment of FIG. 2 is not limited to what is shown in FIG. 2. In practice, the environment of the present invention may include additional devices and/or networks; fewer devices and/or networks; different devices and/or networks; or differently arranged devices and/or networks than illustrated in FIG. 2. Also, in some implementations, one or more of the devices of the environment of FIG. 2 may perform one or more functions described as being performed by another one or more of the devices of the environment. Devices of the environment of FIG. 2 may interconnect via wired connections, wireless connections, or a combination of wired and wireless connections.

Figure 3:
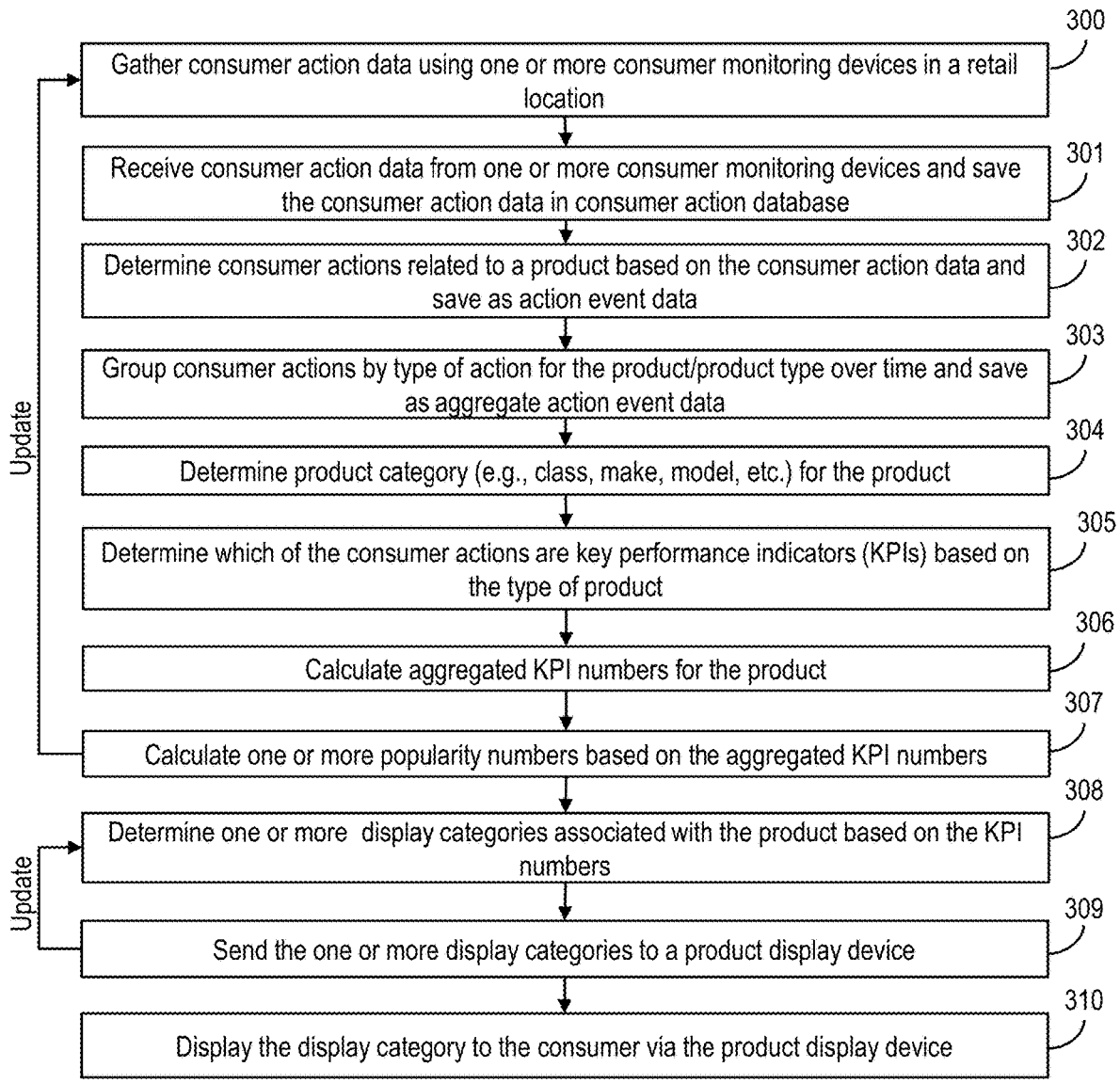
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, one or more consumer monitoring devices 62 gather consumer action data. As used herein the term consumer action data refers to data indicative of physical actions taken by one or more consumers with respect to a product in a physical retail setting (e.g., a store). For example, consumer action data may be data related to a consumer intently looking at a product; stretching a hand out to pick up a product; picking up a product; putting down a product; putting a product in a shopping cart; or other physical actions taken by a consumer as they relate to a product. In aspects, the consumer monitoring devices 62 are in the form of one or more digital cameras or sensors. For example, the consumer monitoring devices 62 may comprise one or more digital video recorders, motion sensors, heat sensors, or the like. In embodiments, the consumer action data comprises digital video data and/or sensor data. In aspects, radio frequency-identification (RFID) tags or other means for tracking the location of products in a retail environment may be utilized to collect consumer action data in accordance with step 300. For example, systems which track the location of products in a retail environment may be utilized in the implementation of step 300 to detect when a consumer has picked up a product or placed a product in a cart.

At step 301, the analytics server 60 receives consumer action data gathered at step 300 from the one or more consumer monitoring devices 62. In aspects, the communication module 76 receives the consumer action data from one or more communication modules 70 of the consumer monitoring devices 62 and saves the consumer action data in the consumer action database 77. For example, the analytics server 60 may receive consumer action data in the form of streaming digital video data from one or more cameras, or sensor data indicative of actions taken by one or more consumers. In aspects, the analytics server 60 receives raw consumer action data from the one or more consumer monitoring devices 62.

At step 302, the analytics server 60 determines one or more consumer actions related to a product based on the consumer action data received at step 301. In embodiments, the analytics module 78 of the analytics server 60 determines one or more consumer actions based on consumer action data stored in the consumer action database 77 and stores these instances of consumer actions in the consumer action database 77 as action event data. It should be understood that various tools and methods for detecting consumer actions may be utilized in the implementation of step 302. For example, the analytics module 78 may comprise image recognition software configured to recognize consumer actions and/or context. Image recognition software may include eye tracking tools. Examples of consumer actions that may be detected by the analytics server 60 include: intently looking at a product but rarely picking it up (e.g., wherein the consumer monitoring devices 62 comprise an eye tracking device fitted at a product holding rack/shelving); stretching hand to pick up a product but rarely picking it up (e.g., found using video analytics); picking up a product from a rack and then putting it back on the rack after some consideration; picking up a product from a rack and then putting it back on the rack immediately; and picking up a product from a rack and keeping it in a shopping cart. In aspects, the analytics server 60 is configured to determine how many times in a given period each of the above-identified consumer actions have occurred.

In embodiments, cameras (e.g., consumer monitoring devices 62) on product racks send image data to the analytics server 60 for processing using eye gaze tracking software. In aspects the analytics server 60 is configured to detect when a consumer is in the range of the camera based on the image data, and to determine if the consumer is intently looking at a given product based on analysis of the image data by the eye gaze tracking software. This may be found by determining a number and duration of eye fixations on the given product.

At step 303, the analytics server 60 groups consumer actions detected at step 302 by type of action (e.g., aggregates consumer action data) for a product over time. In aspects, the analytics module 78 of the analytics server 60 aggregates action event data stored in the consumer action database 77 by type of action to produce aggregate action event data, and saves the aggregate action event data in the consumer action database 77. In embodiments, the analytics module 78 includes a history computing engine for aggregating action event data based on fixed or sliding windows of time. With step 303, the analytics server 60 can track consumer interactions with a product over time. In aspects, the analytics server 60 keeps track of each product of a given product type, and aggregates the per-product information to derive aggregate action event data for different levels of product type (e.g., make or model of product). For example, aggregate action event data may comprises data regarding: how many times products of this product type are intently looked at but not picked up; how many times consumer's hands stretched to pick up the product but did not pick up the product; how many times products of this product type are picked up from a rack but go back to the rack after some consideration; how many times products of this product type are picked up but are not looked upon intently; and/or how many times products of this product type end up in a shopping cart.

At step 304, the analytics server 60 determines a product category for the product. In embodiments, the analytics module 78 determines a product category for the product of interest based on a list or catalog of product categories. A product category may be any type of product category such as a specific product type (e.g., a specific model of toaster); a category of product (e.g., a specific make of toaster), or a broad category of product (e.g., a toaster).

At step 305, the analytics server 60 determines which of the consumer actions determined at step 302 are key performance indicators (KPI) for the product of interest based on the product category determined at step 304. In embodiments, the analytics module 78 determines a subset of the consumer actions determined at step 302 that are KPI for a product of interest based on a look-up table. For example, if the analytics server 60 determines that the product category for a refrigerator of interest is "refrigerator", the analytics module 78 may determine that the consumer action associated with picking up a product are not relevant to the product type "refrigerator". Therefore, the KPIs associated with the refrigerator would be a subset of the total consumer actions detected at step 302 (e.g., the consumer actions would exclude the consumer action of picking up a product).

At step 306, the analytics server 60 calculates aggregated KPI numbers for the product of interest. In embodiments, the analytics module 78 of the analytics server 60 calculates the aggregate KPI numbers for the product of interest. In embodiments, the analytics server 60 applies weights to respective KPI numbers. In aspects, the analytics module 78 applies weights to the respective aggregated KPI numbers based on predetermined weight factors for a product category. For example, a given set of KPIs for a type of product (e.g., a toaster) may include: KPI1—how many times products of this product type are intently looked at but not picked; KPI2—how many times consumer's hands stretched to pick but did not pick; KPI3—how many times products of this product type are picked up from a rack but go back to the rack after some consideration; KPI4—how many times products of this product type are picked up but are not looked upon intently; and/or KPI5—how many times products of this product type end up in the shopping cart.

At step 307, the analytics server 60 calculates one or more popularity numbers based on the aggregated KPI numbers (e.g., based on a subset of the aggregate action event data) from step 306. In aspects, the popularity number may be based on one or more categories of aggregated KPIs. In one example, the analytics module 78 calculates a popularity number E using the following formula: $E=Th(\Sigma_i(f1(z\_i) \circ f2(h\_i) \circ f3(c\_i) \circ f4(n\_i) \circ f5(b\_i)))$; wherein $\{p\_i\}$ is the set of all products of product type P within a given time window, $z\_i$ is the number of times a product of this product type is intently looked at but not picked by a consumer, $h\_i$ is the number of times consumer's hands stretched to pick up $p\_i$ but did not pick up $p\_i$, $c\_i$ is the number of times $p\_i$ is picked up from a rack (or equivalent) but goes back to the rack after some consideration, $n\_i$ is the number of times $p\_i$ are picked up but are not looked upon intently, $b\_i$ is the number of times $p\_i$ end up in a shopping cart, and Th is a function that maps different real (decimal floating) numbers to different emotions (crying, sad, frowning, happy, neutral etc.). Operation o can be a summation, multiplication, or other function. In one example, o is a summation, and the functions f1, f2, f3, f4 and f5 are weights for the respective consumer actions $z\_i$, $h\_i$, $c\_i$, $n\_i$, and $b\_i$.

It should be understood that step 307 may be performed in an ongoing or periodic basis, such that the analytics server 60 may automatically update the one or more popularity numbers continuously or periodically to reflect changes in consumer perception of the products over time. For example, the analytics server 60 may be programmed to perform step 307 on a continuous, weekly, biweekly, or monthly basis.

At step 308, the analytics server 60 determines one or more display categories associated with a product of interest based on the popularity number calculated at step 307. The term display category as used herein refers to a display indicative of the implicit popularity of the product. In other words, the one or one or more display categories determined by the analytics server 60 each represent a measure of consumer popularity of the product. Display categories may include emoji (e.g., emoticons), one or more popularity numbers determined at step 307, a symbolic rating (e.g., a rating based on 1-5 stars, colors, bar graphs, pie charts, etc.) indicative of the implicit popularity of the product of interest, or combinations thereof, for example.

In embodiments, the product performance module 79 includes an emotion computing engine for determining an emotion associated with a popularity number, and an emotion rendering engine for rendering a display category (e.g., icon) representative of an emotion. In aspects, the product performance module 79 determines an emotional output category based on the popularity number determined at step 307. In one example, the popularity number is associated with emotions indicative of the popularity of products. For example, the popularity number E may map to the following output categories: 1) crying, if the product is intently looked upon by many people but rarely picked up; 2) sad, if many people stretched hands to pick up the product but the majority of consumers did not pick up the product; 3) frowning, if many people pick up the product but then put it back on the rack (or equivalent); 4) happy, whenever the product is picked up from the rack and ends up in a shopping cart; and 5) neutral not otherwise fitting in another predetermined output category. For example, the product performance module 79 may determine that a popularity number of 80 maps to a "happy" output category. In embodiments, one or more display categories (e.g., emoji) are determined based on the product, the product type and some or all KPIs for the product or product type.

It should be understood that, like step 307, step 308 may be performed in an ongoing or periodic basis, such that the analytics server 60 may dynamically or automatically update the one or more display categories to reflect changes in consumer perception of products over time. The performance of step 308 may be performed in conjunction with step 307. For example, the analytics server 60 may be programmed to perform step 308 on a continuous, weekly, biweekly, or monthly basis.

At step 309, the analytics server 60 sends one or more display categories to the product display device 64 associated with the product of interest. In aspects, the product performance module 79 sends one or more display categories (determined at step 308) to the communication module 72 of the product display device 64 via the communication module 76 of the analytics server 60. It should be understood that, like steps 307 and 308, step 309 may be performed in an ongoing or periodic basis, such that the analytics server 60 may dynamically update the display categories sent to the product display devices 64 based on changes in consumer perception of the products over time. The performance of step 309 may be performed in conjunction with step 308. For example, the analytics server 60 may be programmed to perform step 309 on a continuous, weekly, biweekly, or monthly basis. The type and amount of information sent to the product display device 64 for display may be based on display policies and the size of the product display device 64 at issue. For example, the analytics server 60 may determine one or more display categories to send to the product display device 64 at steps 308 or 309 based on predetermined display policies (associated with one or more product display devices 64) accessed by the analytics server 60.

At step 310, the product display device 64 displays the one or more display categories received from the analytics server 60 to a user via the display 73. In embodiments, the display 73 may be configured to display a plurality of display categories. For example, the display 73 may depict a first icon indicative of the implicit popularity of the product model and a second icon indicative of the implicit popularity of the product make (i.e. brand) for a type of product (e.g., toaster).

While steps 302-310 are discussed with respect to one product of interest, it should be understood that the analytics server 60 may perform steps 302-310 for multiple products simultaneously. Moreover, the analytics server 60 may perform steps 302-310 automatically and may update the various steps periodically or continuously in a dynamic and automatic manner.

Figure 4:
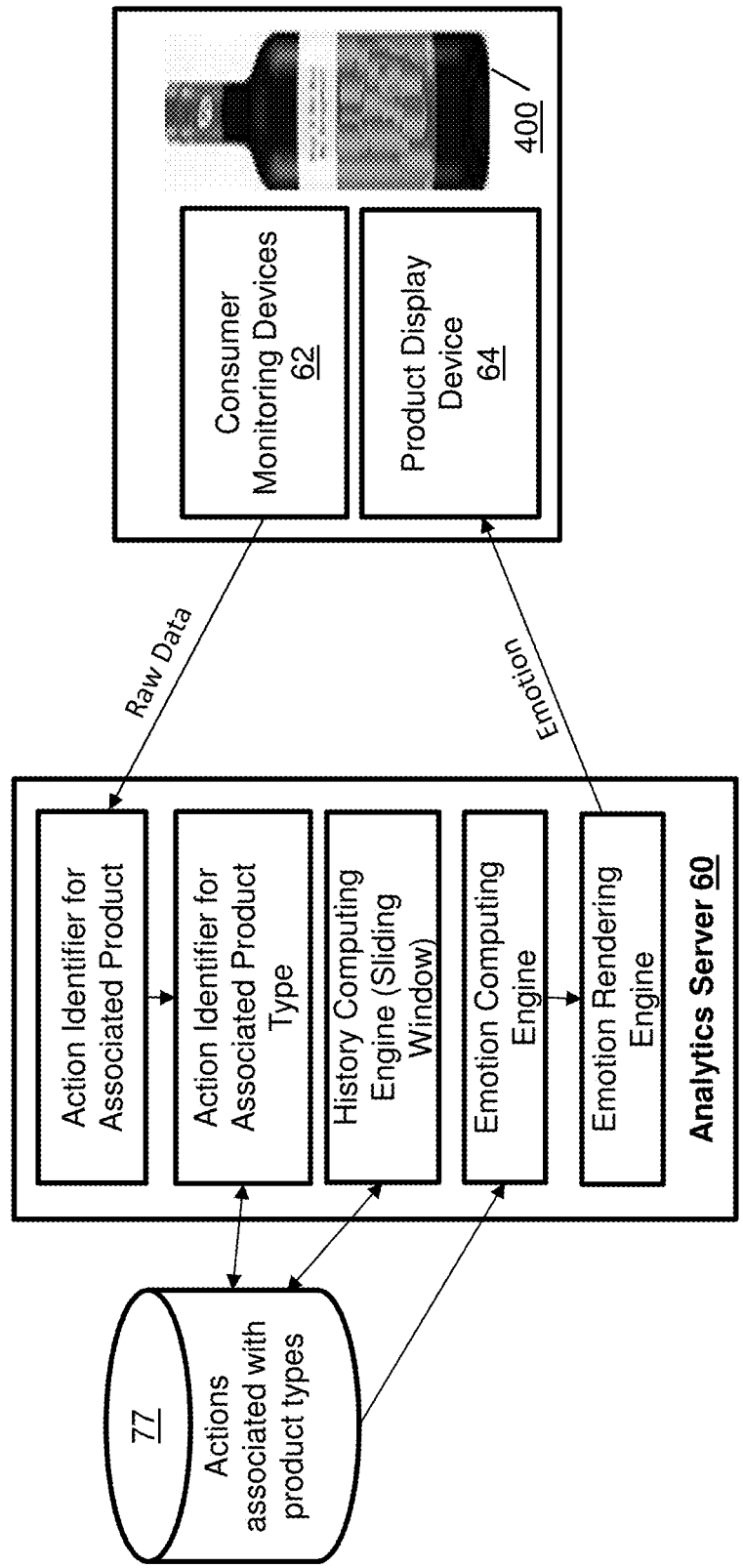
FIG. 4 shows a flow diagram for methods of the present invention.

FIG. 4 shows a flow diagram for methods of the present invention. Steps illustrated in FIG. 4 may be performed in the environment illustrated in FIG. 2, and in accordance with the method steps of FIG. 3. As depicted in FIG. 4, the analytics server 60 may receive raw consumer interaction data from one or more consumer monitoring device 62, and may identify one or more consumer actions associated with a product 400. In this example, product 400 has the product display device 64 attached thereto, and is positioned on a rack adjacent the consumer monitoring devices 62. The analytics server 60 may also identify one or more consumer actions associated with a product type associated with the product 400 (e.g., motor oil). The consumer actions identified by the analytics server 60 are then saved in the consumer action database 77. A history computing engine of the analytics server 60 may aggregate action event data stored in the consumer action database 77 to produce aggregate action event data, and save the aggregate action event data in the consumer action database 77. An emotion computing engine of the analytics server 60 may utilize the aggregated action event data from the consumer action database 77 to calculate an implicit popularity number for the product 400 in accordance with step 307 of FIG. 3, and an emotion rendering engine of the analytics server 60 may utilize the implicit popularity number to determine an emotional display category. The analytics server 60 may then send the emotional display category to the product display device 64 of the product 400 for display to consumers.

Figure 5:
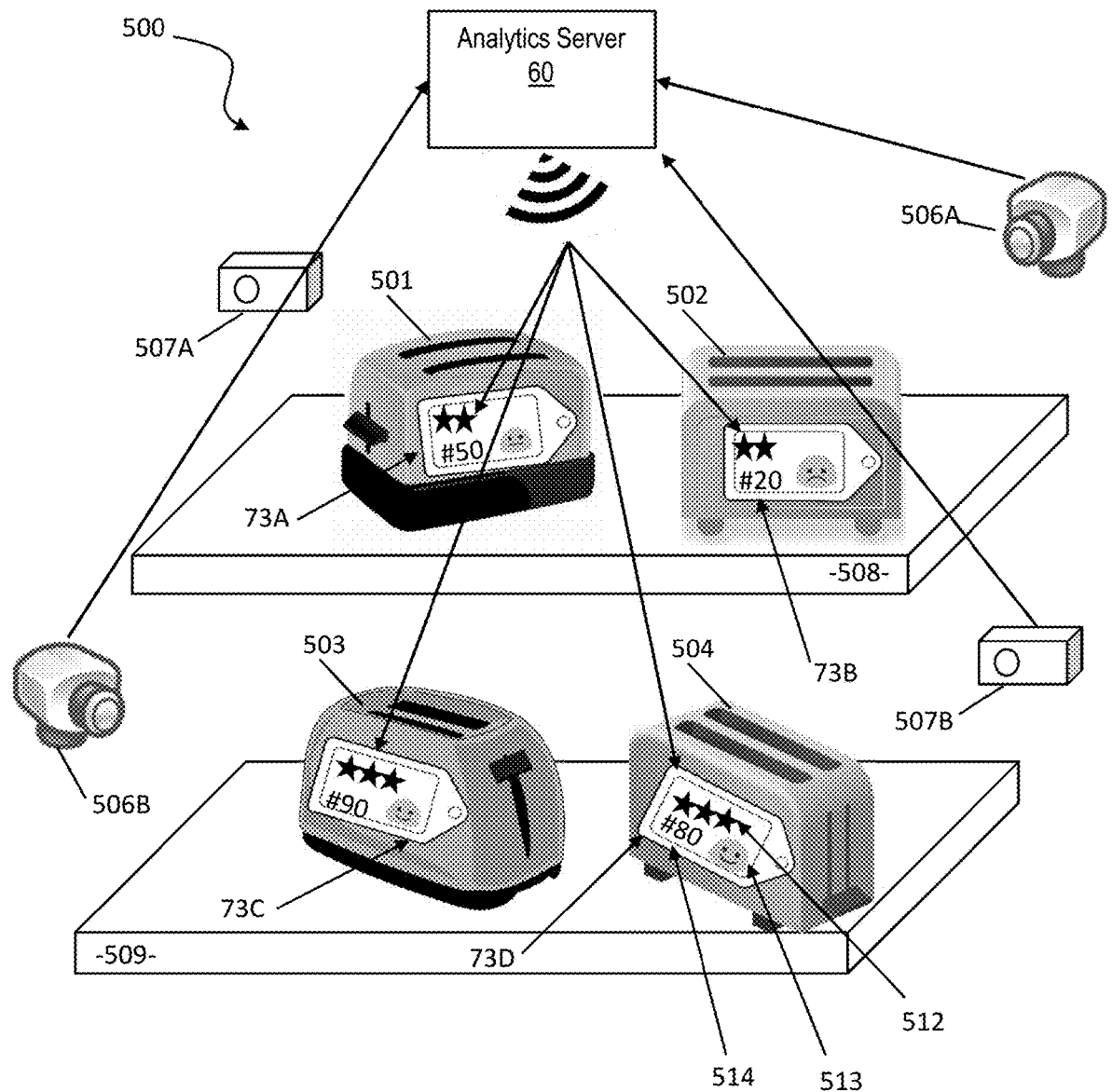
FIG. 5 illustrates an exemplary use scenario in accordance with embodiments of the present invention.

FIG. 5 illustrates an exemplary use scenario in accordance with embodiments of the present invention. FIG. 5 depicts components of the environment illustrated in FIG. 2, and in accordance with method steps of FIG. 3. In the exemplary use scenario of FIG. 5, a plurality of products for sale at a retail environment 500 are represented by toasters 501-504. A plurality of consumer monitoring devices 62 in the form of digital video cameras 506A and 506B and sensors 507A and 507B are located adjacent the toasters 501-504, and are adapted to record consumer action data related to actions taken by consumers with respect to the toasters 501-504. Over time, the digital video cameras 506A, 506B and sensors 507A, 507B record consumer actions data and send the data to the analytics server 60 via wireless communication means. Specifically, the following actions are recorded: multiple consumers gazing at the toasters 501-504, multiple consumers stretching their hands towards the toasters 501-504, multiple consumers picking up the toasters 501-504 to put the toasters 501-504 in shopping carts, multiple consumers picking up the toasters 501-504 and putting the toasters 501-506 back on a shelf (e.g., shelf 508 or 509).

Still referencing FIG. 5, the analytics server 60 analyzes the consumer action data and determines that three display categories are associated with the toasters 501-504. The three display categories are sent to respective display tags 73A-73D of toasters 501-504 for display to consumers. In this example, a first display category represented at 512 is in the form of a symbolic rating scale (1-4 stars, with 4 stars being more popular than 1 star) for a product maker (brand of toaster). As depicted, the first display category 512 indicates that the brand of toasters 501 and 502 both have a two star rating based on aggregated consumer interaction data, while the brand of toasters 503 and 504 have a three star rating. A second display category represented at 513 is in the form of an emoticon representing implicit popularity of the toaster based on at least one KPI. In this example, the second display category 513 (neutral emoticon) of toaster 501 indicates a neutral popularity score, the second display category 513 (frowning emoticon) of toaster 502 represents a negative popularity score, and the second display category 513 (smiling emoticons) of toasters 503 and 504 represent a positive popularity score for the particular model of toaster. A third display category represented at 514 is also shown, wherein the third display category is in the form of the implicit popularity number calculated in accordance with step 307 of FIG. 3. In this example, popularity numbers map to the level of popularity of a toaster, with a lower implicit popularity score (e.g., #20 of toaster 502) being associated with lower popularity of the toaster, and a higher popularity score (e.g., #90 of toaster 503) being associated with a higher popularity of the toaster.

With reference to FIG. 5, a consumer within the retail environment 500 may determine implicit popularity of the various toasters 501-504 based on the display categories 512-514 displayed by the display tags 73A-73D. While FIG. 5 depicts only one product display device 64 per product, it should be understood that multiple product display devices 64 could be utilized. Moreover, although product display devices 64 are depicted as removable devices, the product display devices 64 may be incorporated in or fixed to a product.

In embodiments, a service provider could offer to perform the processes described herein. In this case, the service provider can create, maintain, deploy, support, etc., the computer infrastructure that performs the process steps of the invention for one or more consumers. These consumers may be, for example, any business that uses technology. In return, the service provider can receive payment from the consumer(s) under a subscription and/or fee agreement and/or the service provider can receive payment from the sale of advertising content to one or more third parties.

In still another embodiment, the invention provides a computer-implemented method for calculating and displaying implicit popularity of products. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a computing device, real-time consumer interaction data, wherein the real-time consumer interaction data is related to a product at a location;

identifying, by the computing device, a set of consumer actions related to the product based on the real-time consumer interaction data, wherein the set of consumer actions comprise a plurality of different physical actions related to the product of the multiple consumers over a span of time at the location;

aggregating, by the computing device, the set of consumer actions related to the product by type of physical action over time, thereby producing aggregated action event data;

applying, by the computing device, different predetermined weights to each of the respective types of physical actions in the aggregated action event data, thereby producing weighted aggregated action event data;

calculating, by the computing device, an implicit popularity number for the product based on the weighted aggregated action event data, wherein the implicit popularity number is based on a total number of times each of the respective types of physical actions in the set of consumer actions related to the product is performed by the multiple consumers over the span of time at the location, the set of consumer actions being identified from the real-time consumer interaction data; and sending, by the computing device, a display category to a digital product display device associated with the product and at the location via the network connection, for display on the digital product display device, based on the implicit popularity number, wherein the display category represents a real-time measure of location-based consumer popularity of the product, wherein the real-time consumer interaction data is in the form of streaming digital video data from one or more cameras at the location via a network connection, wherein the identifying the set of consumer actions related to the product comprises analyzing the streaming digital video data using image recognition software, and wherein the real-time consumer interaction data further comprises sensor data from motion detecting sensors, the method further comprising analyzing the sensor data to determine the set of consumer actions related to the product.

2. The method of claim 1, further comprising:
  determining, by the computing device, a product category of the product; and
  determining, by the computing device, that a subset of the plurality of different physical actions are key performance indicators associated with the product category based on a look-up table, wherein the identifying the set of consumer actions related to the product comprises identifying the key performance indicators, and wherein the predetermined weights for each of the types of physical action are based on the determined product category of the product, such that the implicit popularity number is based on the weighted key performance indicators.

3. The method of claim 1, further comprising automatically updating the display category by:
  determining, by the computing device, a new set of consumer actions related to the product based on new recorded consumer interaction data, wherein the new set of consumer actions comprise actions of multiple consumers over a second span of time;
  aggregating, by the computing device, the consumer actions by type of action over time, thereby producing new aggregated action event data;
  calculating, by the computing device, an updated implicit popularity number for the product based on the new aggregated action event data; and
  sending, by the computing device, an updated display category to the product display device based on the updated implicit popularity number.

4. The method of claim 1, further comprising:
  determining, by the computing device, an emotion based on a weighted combination of the key performance indicators; and
  selecting, by the computing device, an emoticon associated with the emotion, wherein the display category comprises the emoticon.

5. The method of claim 1, wherein the consumer interaction data is further related to a second product at the location and is based on the physical actions of multiple consumers over the span of time at the location, the method further comprising:
  identifying, by the computing device, a second set of consumer actions related to the second product based on the consumer interaction data by analyzing the streaming digital video data using image recognition software, wherein the second set of consumer actions comprise a plurality of different physical actions of the multiple consumers over the span of time at the location;
  determining, by the computing device, a product category of the second product;
  determining, by the computing device, that a subset of the second set of consumer actions are key performance indicators associated with the product category;
  aggregating, by the computing device, the subset of the second set of consumer actions by type of physical action over time, thereby producing aggregated action event data related to the second product for the multiple consumers over the span of time at the location;
  applying, by the computing device, different predetermined weights to each of the respective types of physical actions in the aggregated action event data related to the second product, thereby producing weighted aggregated action event data related to the second product for the multiple consumers over the span of time at the location;
  calculating, by the computing device, an implicit popularity number for the second product based on the weighted aggregated action event data, wherein the implicit popularity number is based on a total number of times each of the respective types of physical actions in the subset of the second set of consumer actions is performed by the multiple consumers over the span of time at the location, the subset of the second set of consumer actions being identified from the real-time consumer interaction data; and
  sending, by the computing device, a display category to a second digital product display device associated with the second product at the location via the network connection, for display on the second digital product display device, based on the implicit popularity number for the second product, wherein the display category represents a real-time measure of location-based consumer popularity of the second product.

6. The method of claim 5, wherein the product and the second product have a same product category, the digital product display device is located on the product, the second digital product display device is located on the second product, and the display category of the product is different from the display category of the second product.

7. The method of claim 6, wherein the product category is an appliance, and the image recognition software includes eye tracking tools.

8. The method of claim 5, wherein the calculating the implicit popularity number for the product and the calculating the implicit popularity number for the second product are performed in an ongoing or periodic basis such that the implicit popularity number of the product and the implicit popularity number of the second product are continuously or periodically updated based on the real-time consumer action data.

9. A computer program product for calculating and displaying implicit popularity of products, the computer program product comprising a computer readable storage medium having program instructions embodied therewith, the program instructions executable by a computing device to cause the computing device to:
  receive, real-time consumer interaction data from one or more cameras in a physical environment;
  identify consumer actions related to a product based on the real-time consumer interaction data, wherein the consumer actions comprise a plurality of different physical actions of multiple consumers over a span of time in the physical environment;
  aggregate the consumer actions by type of physical action over time, thereby producing aggregated action event data;
  apply different predetermined weights to each of the respective types of physical actions in the aggregated action event data, thereby producing weighted aggregated action event data for the product;
  calculate an implicit popularity number for the product based on the weighted aggregated action event data, wherein the calculating the implicit popularity number is performed in an ongoing or periodic basis such that the implicit popularity number is continuously or periodically updated based on the real-time consumer action data; and
  send a display category to a digital product display device associated with the product and at the physical environment, for display on the digital product display device, based on the implicit popularity number, wherein the computer program product further causes the computing device to dynamically update the implicit popularity number on a periodic basis and automatically send an updated display category to the product display device based on the update, and wherein the real-time consumer interaction data is in the form of streaming digital video data from cameras in a physical environment, and wherein the identifying consumer actions comprises analyzing the streaming digital video data using image recognition software.

10. The computer program product of claim 9, wherein the program instructions further cause the computing device to:
determine a product category of the product; and
determine that a subset of the plurality of different physical actions are key performance indicators for the product category based on a look-up table, wherein the calculating the implicit popularity number is based on a subset of the weighted aggregated aggregate action event data associated with the key performance indicators.

11. The computer program product of claim 10, wherein the applying different predetermined weights to the respective types of physical actions comprises applying weights to the key performance indicators, thereby producing weighted key performance indicators, wherein the implicit popularity number is based on the weighted key performance indicators, and wherein the key performance indicators are selected from one or more of the group consisting of: how many times products of this product type are intently looked at but not picked; how many times consumer's hands stretched to pick but did not pick the product; how many times products of this product type are picked up but go back after some consideration; how many times products of this product type are picked up but are not looked upon intently; and how many times products of this product type end up in the shopping cart.

12. The computer program product of claim 9, wherein the computer program product further causes the computing device to:
determine an emotion based on the weighted aggregated action event data for the product; and
select an emoticon associated with the emotion,
wherein the display category further comprises the implicit popularity number, and the emoticon.

13. A system for calculating and displaying implicit popularity of products, comprising:
a CPU, a computer readable memory and a computer readable storage medium associated with a computing device;
a plurality of consumer monitoring devices adapted to record consumer interaction data at a physical location;
a digital product display device adapted to display a display category thereon at the physical location;
program instructions to obtain real-time consumer interaction data from the consumer monitoring devices at the physical location, wherein the consumer interaction data is related to a product at the physical location and is based on physical actions of multiple consumers over a span of time at the physical location;
program instructions to identify consumer actions related to a product at the physical location based on the consumer interaction data, wherein the consumer actions comprise a plurality of different physical actions of multiple consumers over time at the physical location;
program instructions to aggregate the consumer actions by type of physical action over time, thereby producing aggregated action event data;
program instructions to apply different predetermined weights to each of the respective types of physical actions in the aggregated action event data, thereby producing weighted aggregated action event data related to the product;
program instructions to calculate an implicit popularity number for the product based on the weighted aggregated action event data;
program instructions to send the display category to the digital product display device at the physical location, for display on the digital product display device, based on the implicit popularity number; and
program instructions to dynamically update the implicit popularity number on a continuous basis and automatically send an updated display category to the product display device based on the update, wherein the consumer monitoring devices include one or more cameras, the real-time consumer interaction data comprises streaming digital video data from the one or more cameras, and the identifying consumer actions related to the product at the physical location comprises analyzing the streamlining digital video data using image recognition software.

14. The system of claim 13, further comprising:
program instructions to determine a product category of the product; and
program instructions to determine that a subset of the plurality of different physical actions are key performance indicators for the product category based on a look-up table, wherein the calculating the implicit popularity number is based on the weighted aggregated action event data for the key performance indicators only.

15. The system of claim 14, wherein the applying different predetermined weights to the respective types of physical actions comprises applying weights to the key performance indicators, such that the implicit popularity number is based on weighted key performance indicators.

16. The system of claim 13, further comprising:
program instructions to determine an emotion based on the weighted aggregated action event data for the products; and
program instructions to select an emoticon associated with the emotion,
wherein the display category further includes at least one selected from the group consisting of: the implicit popularity number, the emoticon, a symbolic rating associated with the implicit popularity number, and combinations thereof.

17. The system of claim 13, further comprises program instructions to obtain real-time consumer interaction data in the form of sensor data from motion detecting sensors.

* * * * *